March 31, 1970   G. REBILLY   3,504,370
APPARATUS FOR MEASURING AND RECORDING THE DEPTH
AND PENETRATION SPEED OF A DRILLING BIT
Filed Feb. 26, 1968   8 Sheets-Sheet 1

INVENTOR
GASTON REBILLY
BY
Wenderoth, Lind & Ponack
ATTORNEYS

GASTON REBILLY. INVENTOR

March 31, 1970   G. REBILLY   3,504,370
APPARATUS FOR MEASURING AND RECORDING THE DEPTH
AND PENETRATION SPEED OF A DRILLING BIT
Filed Feb. 26, 1968   8 Sheets-Sheet 3
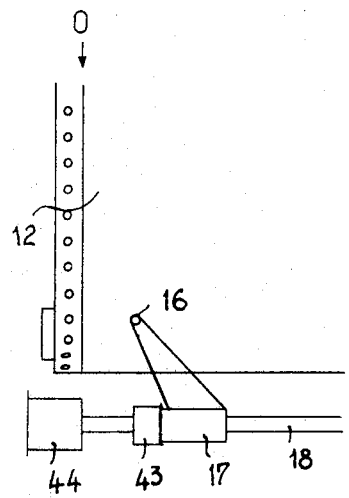
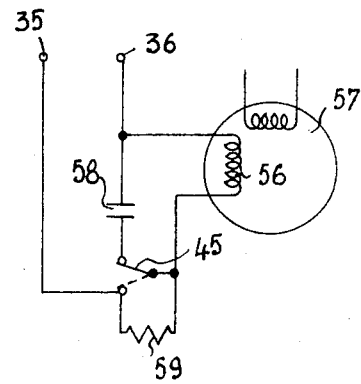
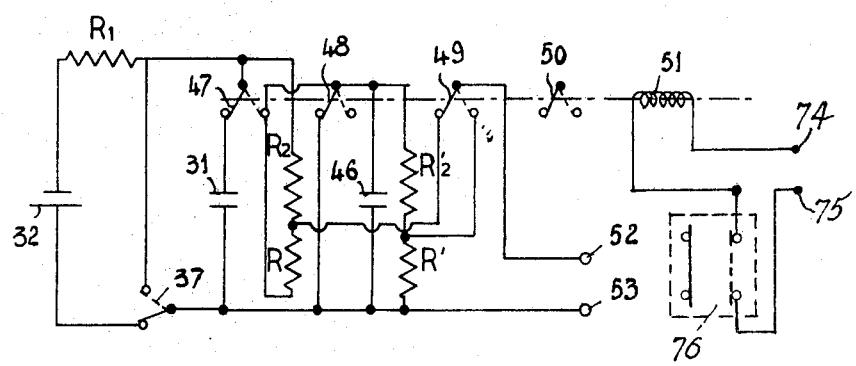
GASTON REBILLY, INVENTOR

GASTON REBILLY, INVENTOR

GASTON REBILLY, INVENTOR

By Wenderoth, Lind & Ponack, attys

March 31, 1970  G. REBILLY  3,504,370
APPARATUS FOR MEASURING AND RECORDING THE DEPTH
AND PENETRATION SPEED OF A DRILLING BIT
Filed Feb. 26, 1968  8 Sheets-Sheet 6

GASTON REBILLY, INVENTOR

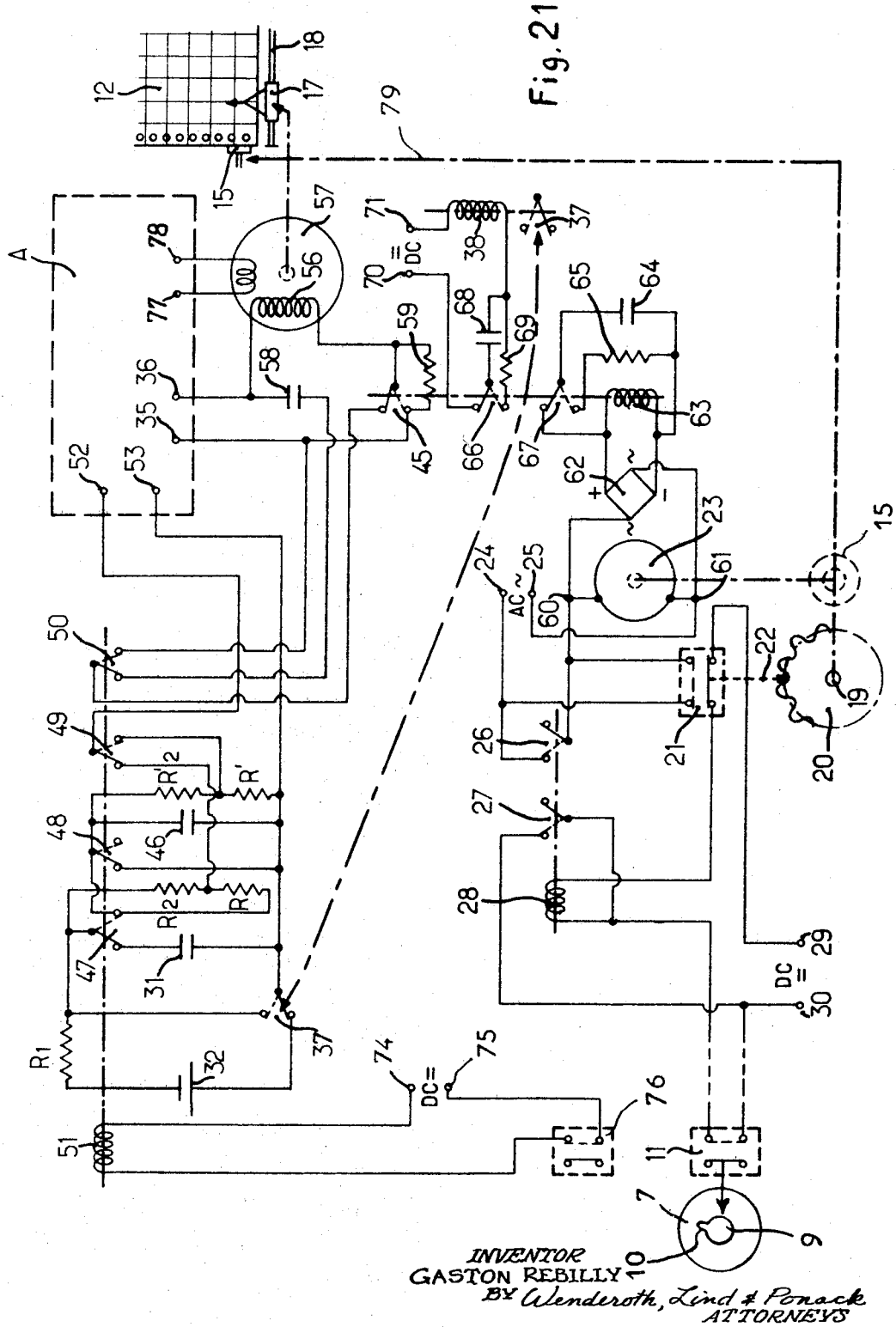

United States Patent Office 3,504,370
Patented Mar. 31, 1970

1

3,504,370
APPARATUS FOR MEASURING AND RECORDING THE DEPTH AND PENETRATION SPEED OF A DRILLING BIT
Gaston Rebilly, Paris, France, assignor to Societe Anonyme dite: Geoservices, Paris, France
Filed Feb. 26, 1968, Ser. No. 708,320
Claims priority, application France, Mar. 14, 1967, 98,588
Int. Cl. G01d 9/20; E21b 45/00
U.S. Cl. 346—33                    12 Claims

ABSTRACT OF THE DISCLOSURE

Apparatus for measuring and recording the depth and penetration speed of drilling apparatus, including a pen recorder connected to the contact of the conventional movement detector. A timing device generates an electric signal dependent on the elapsed time from the previous actuation of the contacts of the movement detector and this electric signal is fed to the pen recorder on each occasion the contact of the movement detector is actuated. The chart is advanced a fixed distance on each occasion the contact of the movement detector is actuated.

This invention relates to an apparatus for measuring and recording the depth and penetration speed of a drilling tool.

When drilling, more particularly for oil, it is, of course, essential to know the depth and penetration speed of the drilling tool. Hitherto, the drilling depth has been measured by a movement detector connected to one of the components of the drilling apparatus, that is to say, on the top of the drilling string (kelly, mud circulating head, hook), or on one of the strands suspending the travelling block, the winch drum, etc.

A detector of this type is designed to emit a signal whenever the drilling bit was advanced through a certain distance, e.g., every 50 cm. or every foot.

Such a detector generally consists of a cable attached to the mud circulating head and wound over an intermediate pulley at the top of the derrick onto a detector pulley and a return-spring winch. The detector pulley has a circumference equal to the unit distance selected and drives a coaxial cam which, once for every revolution of the pulley, operates an electrical contact sending a pulse to a recording system. This cam can be declutched to prevent recording of informatin when drilling has stopped and manoeuvres are taking place (raising of the tool, addition of a rod, etc.).

The object of the invention is to provide an apparatus intended to be connected to a movement detector of the type described and which will provide a record which shows the depth of the tool at any time and from which the penetration speed can be derived.

Embodiments of this invention will now be described, by way of example only, with reference to the accompanying drawing in which.

2

Figure 6:
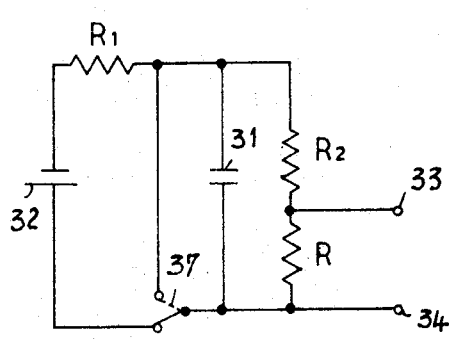
FIG. 6 shows diagrammatically a timing device.
Figure 7:
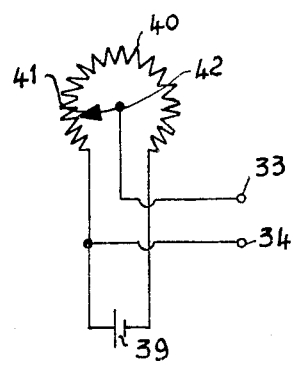
Figure 11:
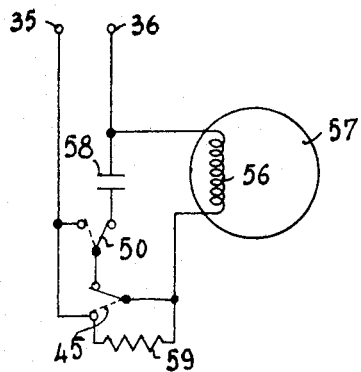
Figure 12:
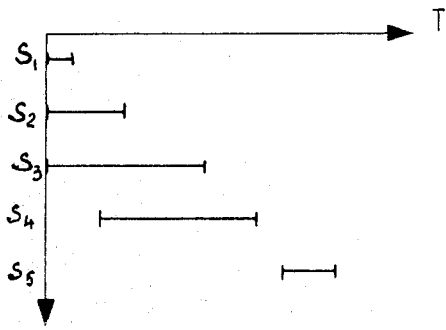
Figure 13:
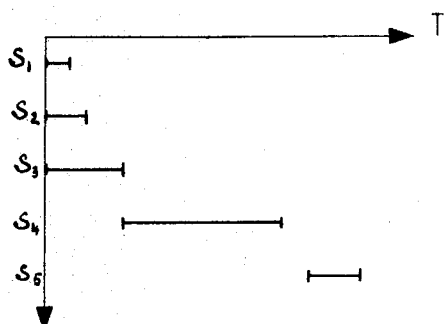
Figure 14:
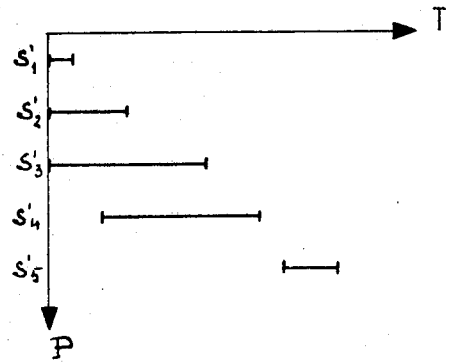
Figure 15:
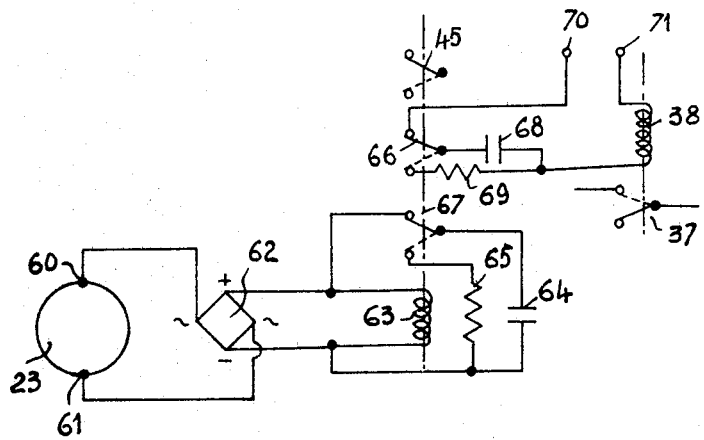
Figure 16:
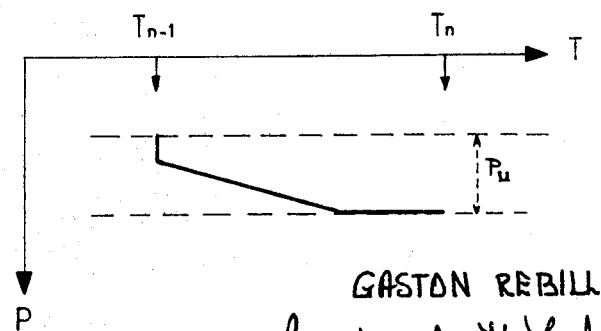
Figure 17:
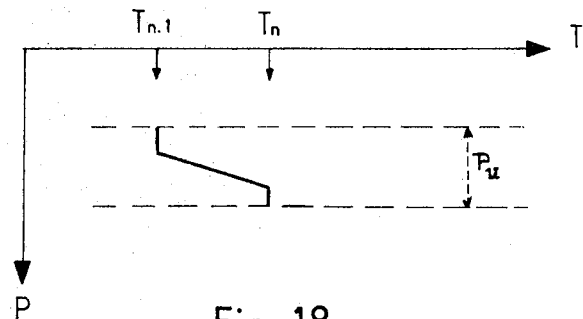
Figure 18:
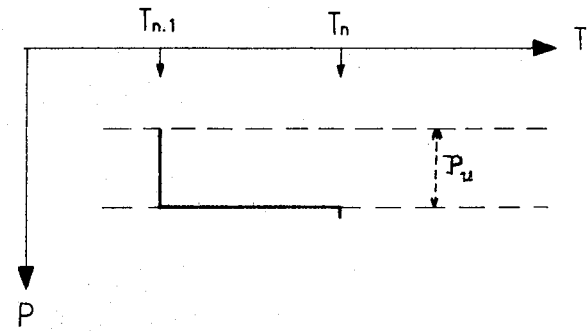
Figure 19:
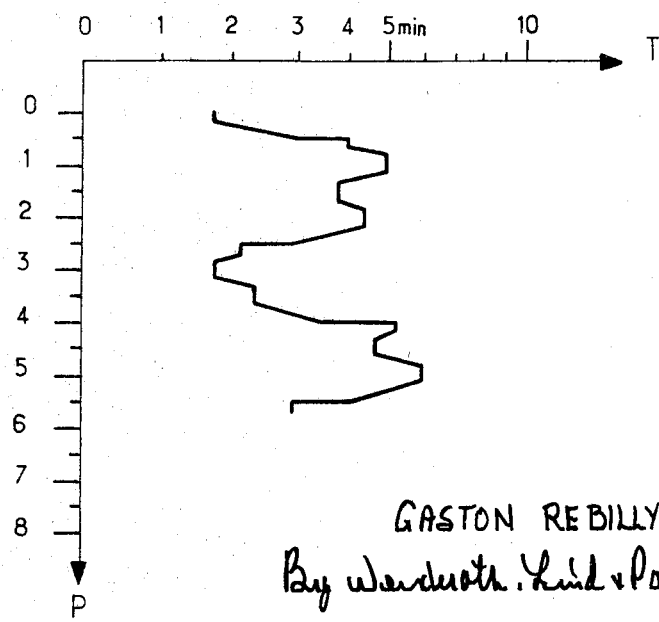
Figure 20:
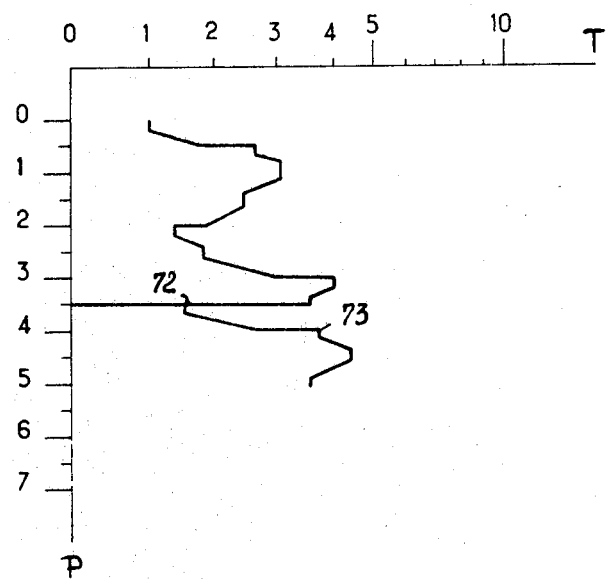

FIG. 7 shows diagrammatically an alternative timing device;

FIG. 8 shows diagrammatically another alternative timing device;

FIG. 9 shows diagrammatically still another alternative timing device which is a variant of the device shown in FIG. 6;

FIG. 10 shows diagrammatically a control circuit for the pen of the pen recorder;

FIG. 11 shows a variant of the circuit in FIG. 10, for use with the timing device shown in FIG. 9;

FIG. 12 shows a mode of programming;

FIG. 13 shows an alternative mode of programming;

FIG. 14 shows a further mode of programming, for use with the timing device in FIG. 8;

FIG. 15 shows diagrammatically a programming device usable for the modes of programming shown in FIGS. 12 to 14;

FIG. 16 shows the type of record obtained with the mode of programming shown in FIG. 12;

FIG. 17 shows the type of record obtained with the mode of programming in FIG. 12;

FIG. 18 shows the type of record obtained with the mode of programming shown in FIG. 13;

FIG. 19 shows a practical record obtained with the mode of programming in FIG. 12;

FIG. 20 shows a record obtained with the devices shown in FIGS. 9 and 11; and

FIG. 21 is an electrical schematic showing a preferred embodiment in one complete circuit those various components and circuitry shown individually in FIGS. 5, 9, 11 and 15.

Figure 1:
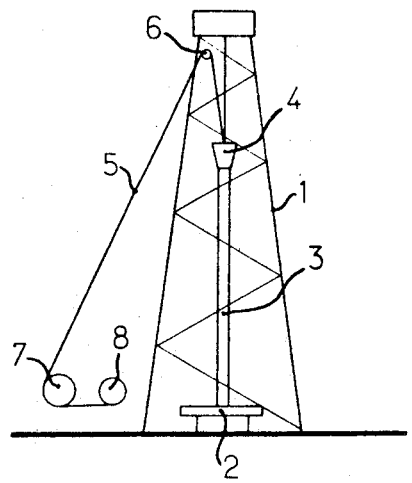
FIG. 1 is a diagrammatic elevation of a conventional movement detector associated with the drilling tool of a derrick.

FIG. 1 shows diagrammatically a derrick or drilling tower 1 whose rotary table 2 serves to operate a conventional square-section rod 3 the rod 3 carries a mud injection head 4 suspended from the top of the tower 1 by a block and tackle. A cable 5 runs from the mud injection head 4 over a pulley 6 at the top of the tower onto a detector pulley 7 associated with a return-spring winch 8.

Figure 2:
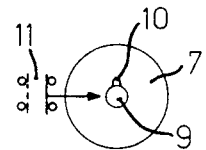
FIG. 2 shows diagrammatically a pulley and a cam of the detector shown in FIG. 1, and an associated electrical contact.

The detector pulley 7 (FIG. 2) is coupled to a shaft 9 through a clutch (not shown). A cam 10 which is keyed to this shaft closes a contact 11 briefly once during each revolution of the pulley 7. The apparatus embodying the invention is designed for use with this conventional movement detector, with the contact 11 initiating all the measuring and recording operations.

Figure 3:
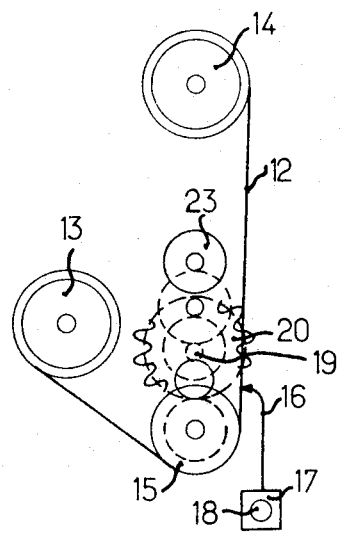
FIG. 3 is a side view of the chart drive and the pen of a pen recorder of apparatus embodying the invention.
Figure 4:
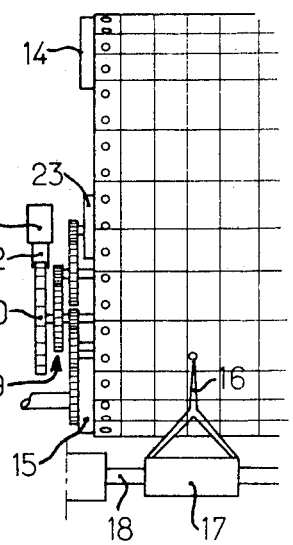
FIG. 4 is a front view corresponding to FIG. 3.

The recorder in the apparatus embodying the invention is shown diagrammatically in FIGS. 3 and 4. It is characterised in that the chart 12, on which the record is made, is drawn downwardly off a feed roller 13, extends round a roller 15; the chart extends upwardly in front of a pen 16 from the roller 15 to a roller 14. The support 17 for the pen 16 moves along a guide rod 18 as described below.

Figure 5:
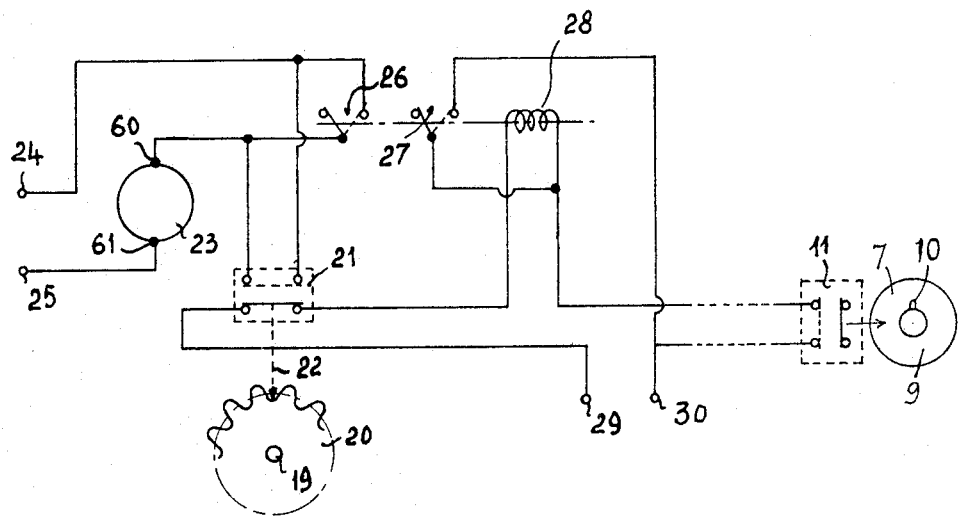
FIG. 5 is a circuit diagram of the chart drive shown in FIGS. 3 and 4.

A toothed wheel 20, which is part of the electrical chart drive shown in FIG. 5, is keyed to a shaft 19 in a gear transmission to be described which connects the roller 15 to a motor 23.

This chart drive is operated by the contact 11 of the movement detector and has a contact 21 whose movable element is moved by a pawl 22 (FIGS. 3, 4 and 5) in engagement with and raised by the teeth of the toothed wheel 20. Gear 20 is mounted upon one of the axes of a standard demultiplication means designated generally at 79, and intercalated between the motor 23 and the roller 15 (FIGS. 3, 4 and 5) for driving the chart. The pitch of the teeth of this wheel is selected in dependence on the velocity ratio between the motor and the shaft 19 so that when the wheel 20 turns through the angle between two successive teeth (i.e., through 360°/n, n being the number of teeth on the wheel), the chart 12 advances a distance corresponding—for a given scale—to the unit distance $P_u$ selected for drilling, e.g., 50 cm. This means that every time the drilling tool has advanced through 50 cm., the movement detector causes the contact 11 to make and at the same time the wheel 20 advances through one tooth.

When the contact 11 (FIG. 5) is operated briefly by the cam 10, the relay 28 is energised and operates changeover switches 26 and 27. Switch 27 holds in the relay 28 which remains energised when the contact 11 returns to rest. Switch 26 energises the motor 23 which is supplied from terminals 24 and 25 and drives the wheel 20. The pawl 22 is lifted by a tooth on wheel 20 and operates the contacts 21. At this instant the relay 28 is no longer energised (by low tension current from terminals 29 and 30) and the changeover switches 26 and 27 return to rest. However, the motor 23 is still supplied through contact 21, and it continues to turn until the tooth on the wheel 20 has been passed and the pawl 21 has fallen into the following valley. The wheel 20 has then moved through the angle between two teeth.

Alternative electrical timing devices for use in the apparatus embodying the invention are shown in FIGS. 6, 7 and 9.

This device is intended to measure the time elapsing between two successive signals from the movement detector, i.e., between two successive closures of the contact 11. It is designed to store a variable, in this case a potential difference, which is a function of the time passing after closure of the contact 11.

By means of this device:

(A) The final value V for the variable is transmitted to the recorder for a brief instant, long enough for the pen of the writing instrument of the recorder to plot this value on the chart;

(B) The final value initially stored is then erased; and (C) Counting of the time passing from the following closure of the contact 11 is resumed at zero.

The potential difference V, which is the variable measured between the points 33 and 34 (FIG. 6), increases as a function of time in accordance with the classical law $$V = V_o \left(1 - e^{\frac{-t}{\tau}}\right)$$

$t$ being the time which has passed,
$\tau$ being the time constant of the circuit, and
$V_o$ being a constant having the dimensions of voltage.

The potential difference V measured is therefore a direct function of $t$.

The timing device shown in FIG. 6, has a charging circuit for a capacitor 31 and a direct-current source 32. The circuit includes two resistances $R_1$ and $R_2$ and a third resistance R which shunts the output terminals 33 and 34 of the device. The terminals 33 and 34 are connected to the output terminals of the recorder measuring circuit.

Discharge of the capacitor 31 is controlled by contacts 37 operated (as will be described below) by a relay 38 in the circuit of a programming device. This programming device (FIG. 15) controls the various operations of the chart drive, the timing device and the recorder proper.

The timing device shown in FIG. 7, has a potentiometric system supplied by a direct-current source 39 and comprising an annular potentiometric resistance 40 wiped by a movable contact 41 connected to a shaft 42 driven by a clock or a synchronous motor in which case a speed reduction device is provided. This measuring device also comprises output terminals 33 and 34 connected to the terminals of the recorder measuring circuit. The shaft 42 can be decoupled by means of a contact replacing the contacts 37 in FIG. 6, the movable contact 41 being reset to zero by a return spring when the coupling is disconnected.

Alternatively, the timing device may comprise a movable ring 43 (FIG. 8) sliding on the guiding shaft 18 for the support 17 for the pen 16, which is moved towards the right by displacement means consisting of a synchronous motor or a clock. The connection between this displacement means (motor or clock) and the means for moving the ring 43 is provided by way of a clutch. When the clutch is disengaged, a return spring (not shown) brings the ring 43 back against a zero abutment 44.

The motor displacing the pen 16 is connected to the mains by closure of a contact 45 in the programming device (see below, FIG. 15).

This motor is such that, during writing, it brings the support 17 for the pen 16 back to bear on the ring 43. If the new advance time which is to be plotted is greater than the preceding time, the ring 43—as it shifts towards the right—pushes the pen support 17 as far as the final position, and when the motor for operating the pen support is energised, the pen remains stationary.

The timing device shown in FIG. 9 is designed to be connected to the control circuit shown in FIG. 11.

This device, which includes the same elements as those shown in FIG. 6, viz the direct-current source 32, the resistances $R_1$, $R_2$ and R, the capacitor 31 and the contact 37, also comprises a second charging circuit with two resistances $R_2'$ and $R'$, a charge capacitor 46, and contacts 47 to 50 which are operated by a relay 51 energised when the detector pulley 7 (FIG. 2) is disconnected. One of the contacts operated by the relay 51, i.e. contact 50, is inserted in the control circuit shown in FIG. 11, the output terminals 52 and 53 of the timing device in FIG. 9 being connected to the terminals of the recorder measuring circuit.

The circuit shown in FIG. 10 provides a control for the pen driving servomotor of a recorder of potentiometric type. It is such that between two signals from the movement detector, i.e., between two closures of the contact 11 (FIGS. 2 and 5), the pen stays at the value previously recorded and does not move until transmission of the following value. To this end, the control winding 56 of a servomotor 57 operating the pen is arranged in parallel with a capacitor 58 and in series with a resistance 59, when the pen is to remain stationary, by means of the contact 45 operated by a relay 63 (FIG. 15). The terminals 35 and 36 are connected to the recorder amplifier control output.

The variant illustrated in FIG. 11 can be adapted to the variant timing device in FIG. 9. It comprises the supplementary contact 50 already mentioned, controlled by the relay 51 of the timing device in FIG. 9 when the detector is disconnected, i.e., when drilling has stopped and manoeuvres are taking place. By means of this device the time during which drilling is interrupted can be recorded (see FIG. 20) and recording can be resumed at the same time as drilling.

Different types of records obtainable with the apparatus embodying the invention are illustrated in FIGS. 16 to 20.

The diagram in FIG. 12 illustrates the different operating stages $S_1$, $S_2$, $S_3$, $S_4$, $S_5$ of the apparatus described.

Stage $S_1$ corresponds to the signal emitted by the detector, i.e., closure of the contact 11.

Stage $S_2$ corresponds to energisation of the relay 28.

Stage $S_3$ corresponds to starting of the motor 23 for advancing the chart 12.

Stage $S_4$ corresponds to operating the contact 45 for recording the advance time.

Stage $S_5$ corresponds to making the contacts 37 for zero resetting of the timing device (erasure of the value = operations B and C).

The record in FIG. 13 shows a different example of distribution in time of the stages $S_1$ to $S_5$.

The record in FIG. 14 illustrates the different operating stages $S_1'$ to $S_5'$ when the timing device in FIG. 8 is used.

Stage $S_1'$ corresponds to the signal from the detector, i.e., closure of the contact 11.

Stage $S_2'$ corresponds to energisation of the relay 28 controlling the changeover switches 26 and 27.

Stage $S_3'$ corresponds to starting of the motor 23 moving the chart 12.

Stage $S_4'$ corresponds to starting of the motor moving the pen, i.e., to closure of the contact 45.

Stage $S_5'$ corresponds to disconnection (operation of contacts 37) and return of the ring 43 to the abutment 44.

As already indicated, all operations in the apparatus are controlled by a programming device with time-lag relays. Such a device is shown diagrammatically in FIG. 15. It is connected to the terminals 60 and 61 (FIG. 5) of the motor 23 for advancing the chart. It is therefore energised at the same time as the motor 23 and for the same time. It comprises a rectifier 62 supplying direct current to a relay 63 the operation of which is delayed by a capacitor 64. This capacitor is discharged at the moment of operation into a resistance 65. Reversing of the contact 45 which operates the pen and is mechanically connected to two changeover switches 66 and 67 in cascade arrangement, is therefore slightly delayed as indicated in FIGS. 12, 13 and 14.

When the relay 63 operates, the changeover of the contact 66 associated with contact 45 causes discharge of the capacitor 68 into a resistance 59. When the relay 63 returns to rest, the relay 38 controlling the zero resetting contacts 37 receives direct current from the terminals 70, 71 across the capacitor 68. Operation of the relay 38 is therefore slightly delayed and the relay returns to rest when the capacitor 68 is charged. The total duration of the programmes illustrated in FIGS. 12 to 14 must of course be less than the tolerable error in the measurement in the advance time, i.e., less than 2 seconds.

The partial records illustrated in FIGS. 16 to 18 illustrate graphs plotted on the chart 12 for different programmes.

In FIG. 16, the graph plotted by the pen of the pen recorder according to the example of programming in FIG. 12 corresponds to drilling of a section unit $P_u$ drilled in the time $T_n$, the preceding time being $T_{n-1}$, and the sloping portion of the graph shows the period of simultaneous rotation of the motor advancing the pen and of the motor 23 advancing the chart.

FIG. 17 illustrates a different example for a section of depth unit $P_u$, the difference between the times $T_n$ and $T_{n-1}$ being smaller.

FIG. 18 illustrates the graph obtained on the chart with the example of programming in FIG. 13, where the motor 23 advancing the chart is started before recording of the advance time (closure of the relay 45).

A practical general record is illustrated in FIGS. 19 and 20.

FIG. 20 shows a record obtained with the device illustrated in FIG. 11 associated with the device in FIG. 9, on the scale 1/100. The zero resetting for a manoeuvre carried out at depth reference 3.5 is clearly seen.

When the switch to manoeuvre is made, i.e., when the detector is disconnected, the relay 51 is energised. The capacitor 31 is isolated and remains charged, while the time is measured by means of the second capacitor 46 and the resistances $R_2'$ and $R'$, the time being recorded by the writing instrument by operating the contact 50 (FIGS. 9 and 11).

When drilling stops for the manoeuvre, the pen returns to zero, then moves to the right (as seen in FIG. 20) according to the time, stopping at 72 when drilling is resumed. The normal measuring circuit, consisting of the capacitor 31 and resistances $R_2$ and R, records the drilling time for the section concerned. At the end of the section the pen records this time at 73, and reference 72 indicates the time during which drilling was suspended.

Referring to FIG. 21, it will be seen that this is representative of a preferred embodiment of the invention and consolidates in one circuit those components and sub-circuits shown in FIGS. 5, 9, 11 and 15. In the upper right hand corner of the figure, the broken outline box designated A is merely a schematic representation of an assembled group of well-known standard electronic elements (potentiometer and its feed, converter, amplifier, etc.) for registering the entry of the measurement being made by the terminals 52, 53 as previously shown in FIG. 9; and the feed of the two windings of the balancing motor being made through the terminals 35, 36, shown previously in FIG. 11, and the terminals designated 77, 78 in FIG. 21, which correspond to those unlettered in FIG. 10.

The well-known apparatus embodies a potentiometric register with an unwinding diagram or chart means of standard type available on the commercial market, and in which devices the tension for measuring is acting in opposition to the variable tension issuing from a potentiometer, the resultant being maintained zero by a suitable servo mechanism comprising an amplifier and diphase balancing motor 57, shown in FIG. 11, which positions the potentiometer and simultaneously drives the pen 16 (FIGS. 3, 4) of the register.

The advance of the chart has been clearly described in the foregoing. Also a measurement of the time elapsed between two signals of contact 11 has been described and the potential difference V set forth in formula form.

The resetting to zero of the arrangement for measuring the time is made by a discharge of the condenser 31, by rocking the contact of the relay 37.

The writing of the time elapsed between two signals upon the diagram is only made during a brief instant after each signal of the time that the pen 16 is normally immovable and that registers the diagram line shown as steps such as those shown upon FIGS. 17–19. For that, the winding of the control 56, of the motor 57 is mounted in an electrical circuit comprising the resistance 59, the condenser 58, and the relay contact 45, such that in the rest position of said contact 45, the motor 57 is immobilized and does not transmit to the pen 16 the value of the tension introduced to the terminals 52 and 53 (as also described relative to FIG. 9) during the instant when the contact 45 is rocked.

The synchronization of the arrangements above is assured by the two delay circuits, the first comprising rectifier 62 mounted at the terminals 60 and 61 of the motor 23 of the chart diagram, a relay with a continuous current 63 and its first contact 67, a resistance 65, and a condenser 64. The second circuit comprises the second contact 66 of the relay 63, the resistance 69, the condenser 68, and the relay 38 fed from the continuous current by the terminals 70 and 71. The contact 37 of the relay 38 serves to send back to zero the measuring time arrangement. These two circuits are such that in the first place the diagram advances a unit of the depth; in the second place, the pen posts the time measured; and in the third place, the arrangement for measuring the time is set back to zero showing one or the other of the synchronization diagrams of FIGS. 12, 13 and 14.

During the momentary stops of the drilling (in order to add a rod or other reason) the changeover switch or contact 76 being rocked either manually or by any known automatic arrangements, the relay 51, fed as by the terminals 74 and 75, intervenes rocking the contacts 47 to 50, which has for an effect replacing that first circuit for measuring the time comprising the condenser 31, and the resistances $R_2$ and R, by the second circuit comprising the condenser 46 and the resistances $R_2'$ and $R'$, while the condenser 31 retains its charge. Also, the contact 50 of the relay 51, again places in operation the motor 57 so that the operation is indicated upon the diagram by a return to zero of the pen 16 which then registers the time of the operation as indicated on FIG. 20.

Accordingly, the foregoing sets forth novel means for achieving, in an improved manner, the objective set forth in the preamble hereof.

I claim:
1. Apparatus for measuring and recording the depth and penetration speed of drilling apparatus comprising in combination:
   (a) drilling apparatus movement detector means including a contact means operable for providing first electric signals which are indicative of depth units;
   (b) pen recorder means including a pen, a movable chart, and an electrical input to activate said pen;
   (c) an electric chart-drive mechanism connected to said contact means of the movement detector means to advance said chart a fixed distance for each of said signals;
   (d) a timing device connected to said contact means for generating a second electric signal in accordance with the elapsed time from the previous first electric depth signal; and
   (e) transmission means for transmitting said second electrical signal of the timing device to said pen upon each of said first electrical signals being provided.

2. Apparatus as claimed in claim 1 wherein said timing device comprises a capacitor, a capacitor charging circuit including a direct current source, a resistance through which the capacitor is connected to the input of the pen recorder, and a changeover switch which controls the discharge of the capacitor and which is operated upon actuation of said contact means of the movement detector means to provide said first signal.

3. Apparatus as claimed in claim 2 wherein said timing device further comprises a second timing device with a further capacitor, an output resistance through which said further capacitor is discharged, contacts which selectively connect one of the timing devices to the input of the recorder, a relay which controls the contacts and is energized when the movement detector means is decoupled from the drilling apparatus.

4. Apparatus as claimed in claim 3 wherein said pen recorder means comprises a control circuit for the pen and includes a contact controlled by said relay.

5. Apparatus as claimed in claim 1 wherein said timing device comprises a potentiometric resistor having a wiper element, a direct current source across which said potentiometric resistor is connected, a constant speed motor, and an electrically operated clutch through which said constant speed motor is coupled to said wiper element of said potentiometric resistor.

6. Apparatus as claimed in claim 1 wherein said timing device comprises a movable ring, a support for said pen, a shaft which carries said movable ring and said support for said pen, and a constant speed motor which drives said ring.

7. Apparatus as claimed in claim 6 wherein said timing device further comprises an electrically operated coupling through which said constant speed motor is connected to said movable ring.

8. Apparatus as claimed in claim 7 wherein the timing device further comprises a zero abutment and a return spring which brings said movable ring into engagement with said zero abutment when said coupling is disengaged.

9. Apparatus as claimed in claim 1 wherein said chart-drive mechanism comprises a drive motor, a drive roller over which the chart extends, a speed reduction transmission interconnecting said drive motor with the drive roller, an energization circuit for the drive motor connected to said contact means of the movement detector, a pair of contacts connected in said energization circuit for said drive motor, said drive motor being energized when said pair of contacts is closed and when the contact of the movement detector is actuated, a toothed wheel driven through the speed reduction transmission, and a pawl which is actuated by the teeth of said toothed wheel and which closes said pair of contacts only when actuated by a tooth, the arrangement being such that said chart advances a distance corresponding, for a given scale, to that of a unit distance selected for the drilling apparatus.

10. Apparatus as claimed in claim 2 wherein said timing device also comprises a programming device including relays and means for delaying the operation of the relays, a rectifier through which said programming device is connected to said chart-drive mechanism, said programming device serving to operate said changeover switch of said timing device, and a further changeover switch which is incorporated in the pen recorder means and which switch is operated by said programming device, said pen recorder means further having an amplifier output and also having a motor which positions its pen and is controlled by said programming device.

11. Apparatus as claimed in claim 9 wherein said programming device further includes a pair of contacts, and wherein said latter motor which positions the pen is connected to said recorder amplifier output upon the pair of contacts in said programming device being closed.

12. Apparatus as claimed in claim 1 wherein said pen recorder comprises a servomotor for positioning the pen and which is such that, in the interval between successive actuations of said contact means of said movement detector, said pen is stationary and does not begin to move until transmission of the next electric signal from said timing device.

References Cited

UNITED STATES PATENTS

| | | | |
|---|---|---|---|
| 2,322,478 | 6/1943 | Scherbatskoy | 346—30 X |
| 2,365,014 | 12/1944 | Silverman et al. | 73—151.5 |
| 2,957,346 | 10/1960 | Knight | 73—151.5 |
| 3,017,770 | 1/1962 | Green | 73—151.5 |
| 3,125,400 | 3/1964 | Moyano | 346—34 |
| 3,129,997 | 4/1964 | Melton et al. | 346—33 |
| 3,413,649 | 11/1968 | Snyder | 346—30 |

JOSEPH W. HARTARY, Primary Examiner

U.S. Cl. X.R.

73—151.5; 346—118